（12）United States Patent
Bradfield

(10) Patent No.: US 7,831,924 B2
(45) Date of Patent: Nov. 9, 2010

(54) METHOD AND APPARATUS TO CONTROL THE DISPLAY OF WINDOWS IN A PROCESSING SYSTEM

(75) Inventor: Terry Ryun Bradfield, Tigard, OR (US)

(73) Assignee: Intel Corporation, Santa Clara, CA (US)

( * ) Notice: Subject to any disclaimer, the term of this patent is extended or adjusted under 35 U.S.C. 154(b) by 882 days.

(21) Appl. No.: 11/388,532

(22) Filed: Mar. 23, 2006

(65) Prior Publication Data

US 2007/0226644 A1 Sep. 27, 2007

(51) Int. Cl.
*G06F 3/048* (2006.01)
(52) U.S. Cl. ............... 715/797; 715/790; 715/791; 715/794; 715/795; 715/796; 715/802
(58) Field of Classification Search .......... 715/790, 715/791, 794, 795, 796, 797, 802
See application file for complete search history.

(56) References Cited

U.S. PATENT DOCUMENTS

| | | | | |
|---|---|---|---|---|
| 5,675,755 A * | 10/1997 | Trueblood | ............... | 715/791 |
| 6,400,379 B1 * | 6/2002 | Johnson et al. | ............... | 715/721 |
| 2003/0048286 A1 * | 3/2003 | Lal | ............... | 345/700 |
| 2004/0135819 A1 * | 7/2004 | Maa | ............... | 345/840 |
| 2004/0261096 A1 * | 12/2004 | Matz | ............... | 725/28 |
| 2005/0030977 A1 * | 2/2005 | Casey et al. | ............... | 370/485 |
| 2005/0119935 A1 * | 6/2005 | Boss et al. | ............... | 705/14 |
| 2005/0262542 A1 * | 11/2005 | DeWeese et al. | ............... | 725/106 |
| 2006/0005148 A1 * | 1/2006 | Cheng et al. | ............... | 715/808 |
| 2006/0090131 A1 * | 4/2006 | Kumagai | ............... | 715/700 |
| 2007/0016867 A1 * | 1/2007 | Nickell et al. | ............... | 715/730 |
| 2007/0129053 A1 * | 6/2007 | Phillips et al. | ............... | 455/404.1 |
| 2007/0240054 A1 * | 10/2007 | Todoroki et al. | ............... | 715/700 |
| 2007/0260987 A1 * | 11/2007 | Mohoney et al. | ............... | 715/723 |

OTHER PUBLICATIONS

Hooks, from the Microsoft MSDN library at http://msdn.microsoft.com/library/default.asp?url=/library/en-us/winui/winui/windowsuserinterface/windowing/hooks.asp.

* cited by examiner

*Primary Examiner*—Sara England
*Assistant Examiner*—John Heffington
(74) *Attorney, Agent, or Firm*—Trop, Pruner & Hu, P.C.

(57) ABSTRACT

A processing system may include a display device, a primary window manager, and an auxiliary window manager. The primary window manager may display a first remote-enabled window in the display device. The processing system may also include a program to generate a mouse-enabled window, and the primary window manager may prevent the mouse-enabled window from displaying in front of the first remote-enabled window. The auxiliary window manager may detect an attempt to display the mouse-enabled window, and, in response, may automatically display a second remote-enabled window in front of the first remote-enabled window. The second remote-enabled window may include an object that a user can select with a remote control to instruct the processing system to display the mouse-enabled window. Other embodiments are described and claimed.

18 Claims, 4 Drawing Sheets

METHOD AND APPARATUS TO CONTROL THE DISPLAY OF WINDOWS IN A PROCESSING SYSTEM

FIELD OF THE INVENTION

The present disclosure relates generally to the field of data processing, and more particularly to methods and related apparatus to control the display of windows in processing systems.

BACKGROUND

Many types of processing systems use graphical user interfaces (GUIs). For instance, in a processing system with the operating system distributed by Microsoft Corporation ("Microsoft") under the name Windows® XP, user applications may display windows on the monitor to present information to the user and to request information from the user. In addition, the user may interact with objects in the windows (e.g., menus, buttons, check boxes, text fields, etc.) to control the operation of the application, to enter data, etc. The operating system itself may also use a GUI with windows to interact with the user. Many different operating systems support GUIs. TO generate windows, applications typically use tools provided by the operating system. Most GUIs are designed and proportioned to work effectively when presented on a monitor situated about two feet away from the user. Accordingly, such a GUI may be said to provide a "two-foot interface." A user may utilize input devices such as a keyboard and a mouse to interact with a two-foot interface. Applications or programs which use two-foot interfaces and not ten-foot interface are referred to herein as legacy applications or programs. Similarly, two-foot interfaces and windows designed to operate within a two-foot interface are referred to as legacy interfaces and legacy windows, respectively. Likewise, the input devices that two-foot interfaces are designed to accept input from, such as keyboards and mice, are referred to as legacy input devices.

For instance, a user can use a mouse to move a pointer that displays in front of the objects in window. When the pointer is positioned in front of a desired object, the user may press a mouse button once to set the focus to that object, or twice in rapid succession (an operation called "double-clicking") to launch a function associated with that object. Sometimes, functions can be launched with a single click. For purposes of this disclosure, a window which allows the user to utilize a mouse to move a pointer, to set the focus to a desired object, and to launch functions associated with objects is referred to as a mouse-enabled window.

Recently, Microsoft released a software package known as Windows® Media Center Edition ("MCE"). That package includes a Windows® XP operating system kernel, as well as one or more additional components, referred to herein collectively as the MCE application. The MCE application runs primarily in the user space (e.g., in ring 3), while the operating system typically runs in the kernel space.

The MCE application makes it easier for a personal computer to be used as the nerve center of a home entertainment center. The monitor that MCE uses may be a television set of other display device, which will typically be situated substantially more than two feet away from the user. The MCE application makes it easier for a person to control the computer from a distance. Thus, the MCE application may be said to provide a "ten-foot interface."

Ten-foot interfaces typically are proportioned to be readable from a distance of about ten feet. In addition, since a user may prefer not to use a keyboard or a pointing device (e.g., a mouse) to control a home entertainment system, the windows in a ten-foot interface may use objects that the user can manipulate with a remote control.

However, MCE may also allow conventional applications to run on the system. That is to say, MCE may support applications which use only a two-foot interface, and which therefore require the user to utilize a keyboard or a mouse (or a similar pointing device) to interact with those applications. Other operating systems may also support both two-foot and ten-foot interfaces. However, as described in greater detail below, supporting two-foot and ten-foot interfaces on the same processing system presents certain challenges.

BRIEF DESCRIPTION OF THE DRAWINGS

Features and advantages of the present invention will become apparent from the appended claims, the following detailed description of one or more example embodiments, and the corresponding figures, in which:

DETAILED DESCRIPTION

One or more embodiments of the present invention pertain to methods and apparatus that may allow a processing system to gracefully transition from a ten-foot interface to a two-foot interface.

Figure 1:
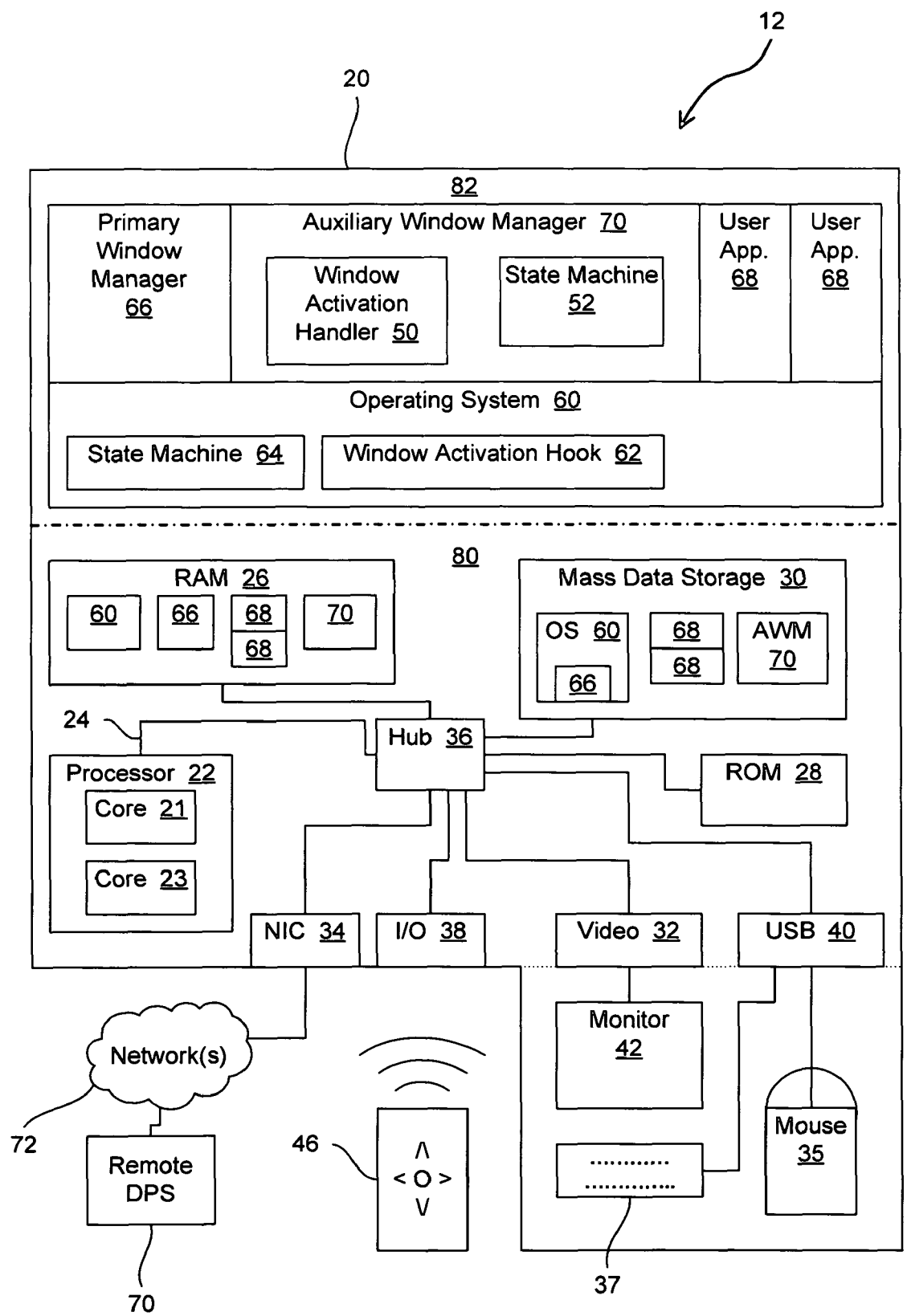
FIG. 1 is a block diagram depicting a suitable data processing environment in which certain aspects of an example embodiment of the present invention may be implemented.

FIG. 1 is a block diagram depicting a suitable data processing environment 12 in which certain aspects of an example embodiment of the present invention may be implemented. Data processing environment 12 includes a processing system 20, that includes various hardware components 80 and software components 82. The hardware components may include, for example, a processor or CPU 22, communicatively coupled to various other components via one or more system buses 24 or other communication pathways or mediums. In the example embodiment, CPU 22 includes multiple processing units, such as a first processing core 21 and a second processing core 23. Alternatively, the CPU may have a single core, or a processing system may include multiple CPUs, each having at least one processing unit.

As used herein, the terms "processing system" and "data processing system" are intended to broadly encompass a single machine, or a system of communicatively coupled machines or devices operating together. Example processing systems include, without limitation, distributed computing systems, supercomputers, high-performance computing systems, computing clusters, mainframe computers, mini-computers, client-server systems, personal computers (PCs), workstations, servers, portable computers, laptop computers, tablet computers, PDAs, telephones, handheld devices, entertainment devices such as audio and/or video devices, and other devices for processing or transmitting information.

Processing system 20 may be controlled, at least in part, by input from conventional input devices, such as a keyboard, a pointing device such as a mouse, etc. In particular, in the example embodiment, a mouse 35 and a keyboard 37 are connected to processing system 20 via one or more USB ports 40. A pointing device is a mechanism (e.g., a mouse, a trackball, etc.) that a user can manipulate to move a pointer around on a display device such as monitor 42. For purposes of this disclosure, the term "mouse" should be construed to cover any such pointing device.

Processing system 20 may also respond to directives or other types of information received from other processing systems or other input sources or signals. Processing system 20 may utilize one or more connections to one or more remote data processing systems 70, for example through a network interface controller (NIC) 34, a modem, or other communication ports or couplings. Processing systems may be interconnected by way of a physical and/or logical network 72, such as a local area network (LAN), a wide area network (WAN), an intranet, the Internet, etc. Communications involving network 72 may utilize various wired and/or wireless short range or long range carriers and protocols, including radio frequency (RF), satellite, microwave, Institute of Electrical and Electronics Engineers (IEEE) 802.11, 802.16, 802.20, Bluetooth, optical, infrared, cable, laser, etc.

Within processing system 20, processor 22 may be communicatively coupled to (a) one or more volatile or non-volatile data storage devices, such as RAM 26 and read-only memory (ROM) 28, (b) mass storage devices 30 such as integrated drive electronics (IDE) or small computer system interface (SCSI) hard drives, and/or (c) other devices or media, such as floppy disks, optical storage, tapes, flash memory, memory sticks, compact flash (CF) cards, digital video disks (DVDs), etc. For purposes of this disclosure, the term "ROM" may be used in general to refer to non-volatile memory devices such as erasable programmable ROM (EPROM), electrically erasable programmable ROM (EEPROM), flash ROM, flash memory, etc. Processor 22 may also be communicatively coupled to additional components, such as one or more video controllers 32, SCSI controllers, network controllers, universal serial bus (USB) controllers, I/O ports 38, input devices such as mouse 35, keyboard 37, a camera, etc. Processing system 20 may also include one or more bridges or hubs, such as a memory controller hub (MCH) 36, an I/O controller hub (ICH), a peripheral component interconnect (PCI) root bridge, etc., for communicatively coupling system components. As used herein, the term "bus" includes pathways that may be shared by more than two devices, as well as point-to-point pathways.

Some components, such as NIC 34, for example, may be implemented as adapter cards with interfaces (e.g., a PCI connector) for communicating with a bus. Alternatively, NIC 34 and other devices may be implemented as on-board or embedded controllers, using components such as programmable or non-programmable logic devices or arrays, application-specific integrated circuits (ASICs), embedded computers, smart cards, and the like.

In the example embodiment, I/O port 38 includes an infrared sensor for receiving signals from a remote control 46. In other embodiments, the I/O port and the remote control may use other means of wireless communication. As depicted, remote control 46 includes arrow buttons for moving the focus between objects in a menu, and a select button for selecting the object with focus. In addition, remote control 46 may be significantly smaller that a typical computer QWERTY keyboard. For instance, remote control 46 may be less than 8.5 inches long, less than 3.5 inches wide, and less than 1 inch thick. Remote control 46 does not include 36 distinct keys for entering the 26 letters in the English alphabet and the 10 Arabic numerals. Remote control 46 may also lack other keys that computer keyboards feature, such as "Shift," "Ctrl," "Alt," etc.

The invention is described herein with reference to or in conjunction with data such as instructions, functions, procedures, data structures, application programs, configuration settings, etc. When the data is accessed by a machine, the machine may respond by performing tasks, defining abstract data types or low-level hardware contexts, and/or performing other operations, as described in greater detail below. The data may be stored in volatile and/or non-volatile data storage. For purposes of this disclosure, the term "program" is used in general to cover a broad range of software constructs, including applications, routines, methods, modules, drivers, subprograms, processes, and other types of software components. For instance, data storage device 30, ROM 28, and/or RAM 26 may include various sets of instructions which, when executed, perform various operations. Such sets of instructions may be referred to in general as software.

For instance, when processing system 20 is in use, RAM 26 may include an operating system 60 and various user applications 68. In the example embodiment, operating system 60 typically runs in ring 0, and user applications 68 run in ring 3. In the example embodiment, processing system 20 includes a primary window manager 66 that provides for a ten-foot interface. In addition, processing system 20 includes an auxiliary window manager 70 that provides for gracefully transitioning from the ten-foot interface to a two-foot interface, when necessary or desirable to allow a user to interact with applications that do not support the ten-foot interface.

In one embodiment, operating system 60 may be the Windows® XP operating system, and primary window manager 66 may be the MCE application. In other embodiments, any other suitable operating system and primary window manager may be used. As reflected in mass data storage 30, primary window manager 66 may be installed with operating system 60. User applications 68 and auxiliary window manager 70 may also be stored in mass data storage 30. The software may be loaded into RAM 26 and executed when processing system 20 is booted or afterwards. Alternatively, some or all software components may be stored remotely (e.g., in network attached storage, in remote processing system 70, etc.) and retrieved by processing system 20 when needed.

As indicate above and reflected within software components 82, in the example embodiment operating system 60 operates primarily from the kernel space, while primary window manager 66, auxiliary window manager 70, and user applications 68 operate primarily from the user space.

Figure 2:
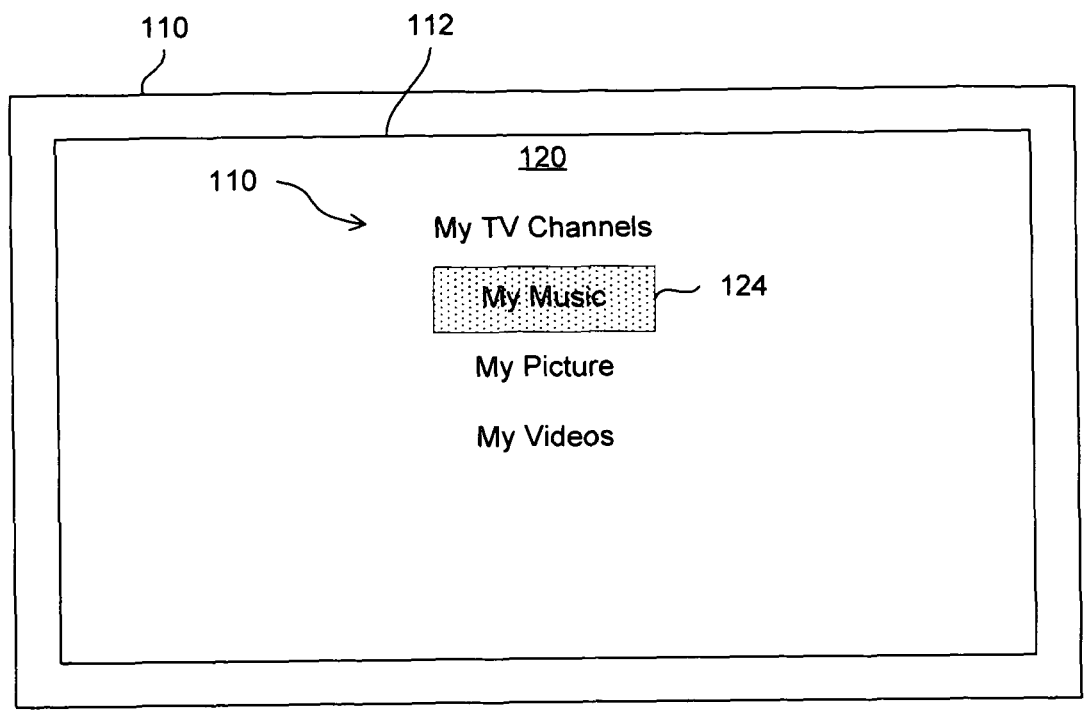
FIGS. 2-4 are schematic diagrams depicting changes in a graphical user interface, according to an example embodiment of the present invention.
Figure 3:
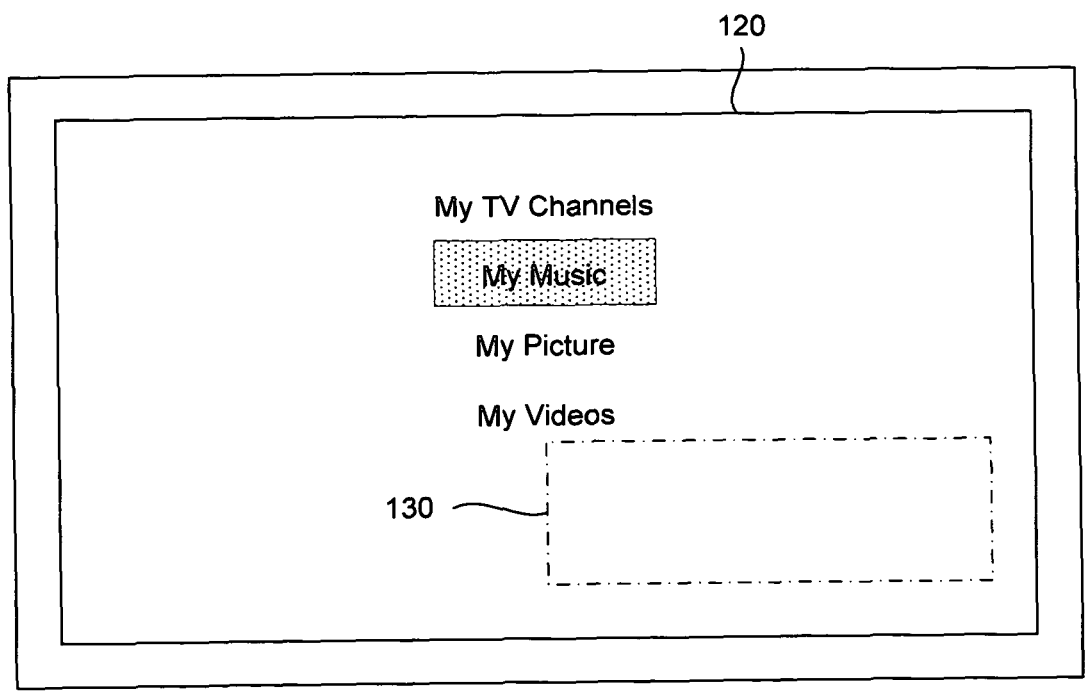
Figure 4:
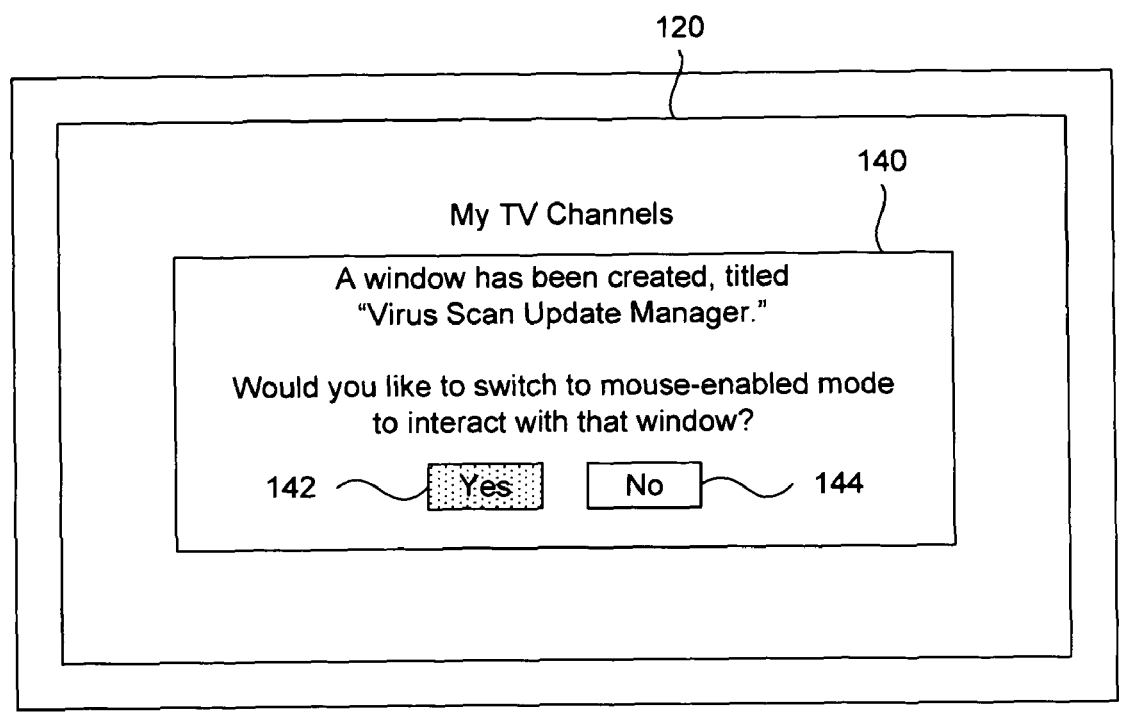

FIGS. 2-4 are schematic diagrams depicting changes in a graphical user interface, according to an example embodiment of the present invention. For instance, FIG. 2 depicts a window 120 that is maximized to fill the space on the visible screen 112 of monitor 42. In particular, window 120 represents a menu generated by primary window manager 66 while primary window manager 66 is set to operate in full screen mode. When primary window manager 66 is operating in full screen mode, primary window manager 66 displays ten-foot interface windows, such as window 120, and primary window manager 66 allows the user to interact with those windows using remote control 46.

The menu in ten-foot interface window 120 includes a number of selectable objects 110, and primary window manager 66 allows the user to use the arrow buttons on remote control 46 to move the focus from object to object. As depicted at menu item 124, primary window manager 66 uses highlighting to indicate which object has the focus. Primary window manager 66 also allows the user to activate or launch a program or function associated with the object that has focus by pressing the select button on remote control 46. For instance, primary window manager 66 may launch a program for playing music if the user presses the select button while the focus is on the "My Music" menu item 124. For purposes of this disclosure, a window which allows the user to utilize a remote control to set the focus to a desired object and to launch functions associated with objects is referred to as a remote-enabled window.

When in full screen mode, primary window manager 66 also generally prevents applications which use two-foot interfaces from displaying windows on top of the ten-foot interface window. For example, if an anti-virus application that uses two-foot interface windows detects a virus while primary window manager 66 is in full-screen mode, the anti-virus application might attempt to display a window to notify the user about the virus. However, primary window manager 66 will typically prevent such a window from displaying, for instance by delegating that window to a position that is behind or hidden by a ten-foot interface window, such as window 120. In FIG. 3, the box with dashed lines represents a two-foot interface window 130 that has been generated by a user application 68, but that is not visible to the user, because primary window manager 66 has caused that window to be hidden.

In other circumstance, a legacy application may successfully display a two-foot interface window in front of a ten-foot interface window, but the user may prefer not to see the two-foot interface window at that time. The user may even be forced to retrieve a mouse or keyboard to get rid of the window. Such a situation may be considered an inconvenience, for example, if the user is sitting on a sofa watching a movie on a home entertainment center, with only a remote control handy. Primary window manager 66 may support numerous display modes, such as a full-screen mode, a minimized mode, and an intermediate- or reduced-size mode. When set to minimized mode or reduced-size mode, primary window manager 66 may allow the user to see and interact with two-foot interface windows.

FIG. 4 depicts a ten-foot interface window 140 which auxiliary window manager 70 has generated and displayed in front of ten-foot interface 120 in response to detecting that a user application has attempted to display a two-foot interface window while primary window manager 66 is set to full screen mode. Auxiliary window manager 70 allows the user to interact with window 140 using remote control 46. In particular, window 140 includes objects such as a "yes" button 142 and a "no" button 144, which a user can focus on and select with the arrows and select button of remote control 45 to indicate whether or not processing system 20 should allow the user to see and interact with a two-foot interface window. If the user selects to display a two-foot interface window (e.g., a window from an anti-virus application or from any other application that uses a two-foot interface), auxiliary window manager 70 may cause primary window manager 66 to switch from full screen mode to some other mode, such as reduced mode or minimized mode. The user may then interact with two-foot interface windows using keyboard 37 and/or mouse 35.

Auxiliary window manager 70 may be implemented as an application that runs in the background and takes control when a legacy application generates a window. For instance, as depicted in FIG. 1, auxiliary window manager 70 may include a window activation handler 50, and auxiliary window manager 70 may use operating system services known as hooks to receive control whenever a legacy application generates or activates a window. Auxiliary window manager 70 may also receive event information from the hooks via pipes, and auxiliary window manager 70 may include a state machine 52 that tracks the current status of primary window manager 66.

Conventionally, when a user application generates a window, the operating system receives control, takes care of the low-level details of rendering the window to the monitor, and then returns a completion code or a return code to the user application, to indicate whether or not the window was successfully displayed.

In the example embodiment, however, when a legacy application generates a window, operating system 60 triggers a window activation hook and passes control to window activation handler 50. Thus, auxiliary window manager 70 may use one or more operating system hooks to trap operating system notification events and messages being sent to a legacy application. As described in greater detail below with respect to FIG. 5, auxiliary window manager 70 may then perform any necessary operations before control is returned to operating system 60 or the user application that generated the window. In one embodiment, the hooks may be called from a graphics subsystem of operating system 60 running in ring 0, and the handlers that handle the hooks may then run in ring 3.

By contrast, window activation hooks may not fire when windows are created for the ten-foot interface. Alternatively, if ten-foot interface windows were to trigger window activation hooks, auxiliary window manager 70 could determine that no intervention is necessary, based on characteristics of the parent window, for instance.

Also, auxiliary window manager 70 may be pre-configured with settings for user preferences that indicate the situations in which auxiliary window manager 70 should provide user notification regarding legacy windows. For instance, the user may establish a "white list" that identifies the applications that should always cause notification, a "black list" that identifies the applications that should not cause notification, and/or any other suitable user preferences. Any suitable approach may be used to set or modify the user preference settings.

Figure 5:
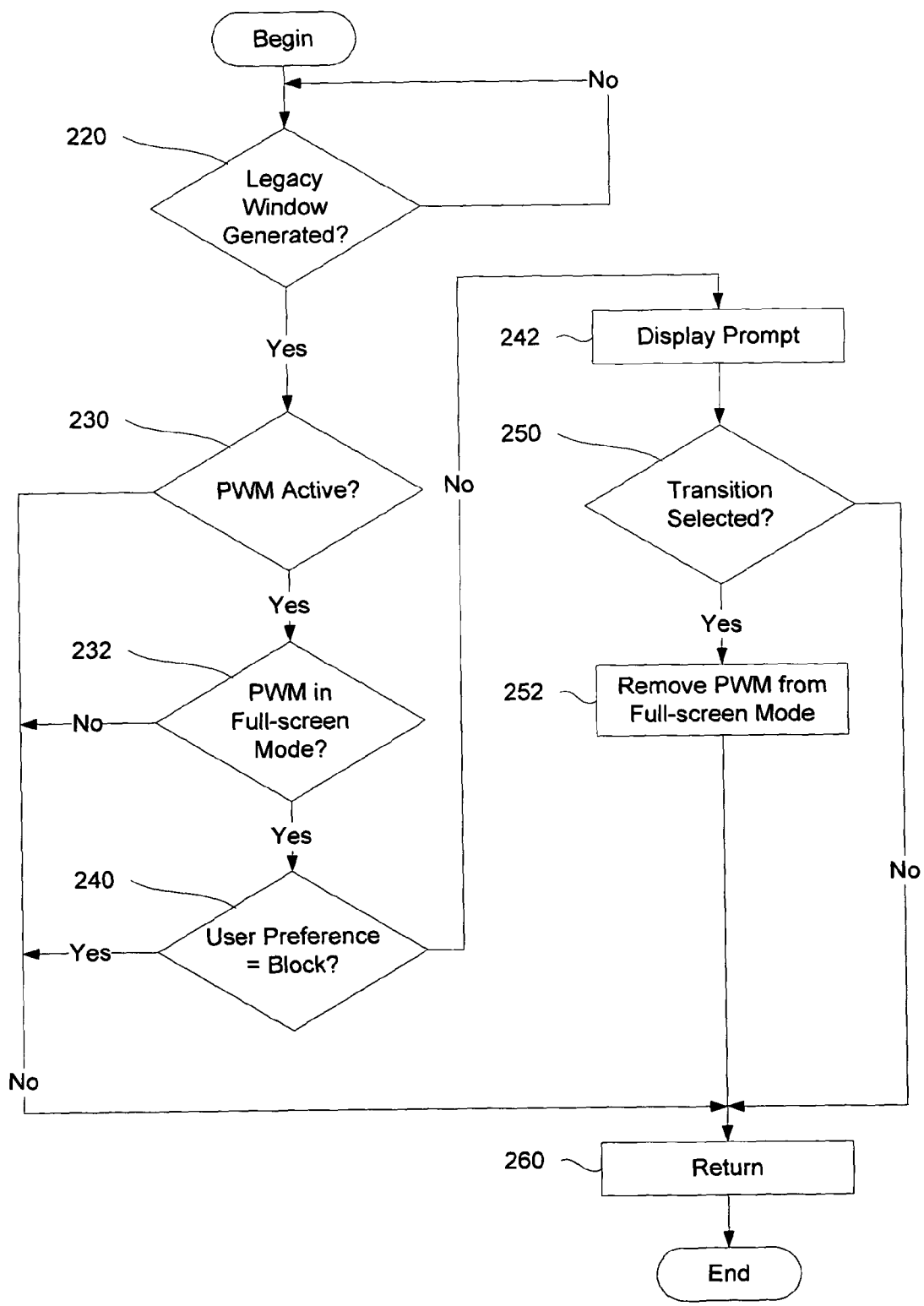
FIG. 5 is a flowchart depicting various aspects of a process for controlling the display of windows, according to an example embodiment of the present invention.

FIG. 5 is a flowchart depicting various aspects of a process for controlling the display of windows, according to an example embodiment of the present invention. The process of FIG. 5 begins after processing system has booted to operating system 60 and auxiliary window manager 70 has been launched. One or more user applications 68 may also have been launched.

In the example embodiment, auxiliary window manager 70 registers itself to start when the user logs in. This can be done as simply as adding a shortcut to the startup menu or through the registry, for example. When auxiliary window manager 70 launches, it registers its DLL with operating system 60, for instance by calling the SetWindowsHookEx function and passing the DLL with the callback. Additional details on the SetWindowsHookEx function may be found on the Internet at msdn.microsoft.com/library/default.asp?url=/library/en-us/winui/winui/windowsuserinterface/windowing/hooks/hookreference/hookfunctions/setwindowshookex.asp. Operating system 60 may then inject code for auxiliary window manager 70 into each application to run on the system, so that the injected code receives events before the application code does.

As depicted at block 220, auxiliary window manager 70 may then simply wait in the background until an application has generated a legacy window. Once an application has generated a window, operating system 60 may fire a system hook that causes operating system 60 to transfer control to window activation handler 50 in auxiliary window manager 70. Window activation handler 50 may then pass the relevant state events for the hook to state machine 52, which may then determine how to respond to the hook. For example, state machine 52 may respond by blocking the event, modifying the event, mapping the even to an alternate user interface, or executing any other suitable response.

In the example embodiment, state machine 52 first determines whether primary window manager 66 is active, as indicated at block 230. For example, if processing system is being used for word processing, web browsing, or any similar function, processing system 20 may be using only the two-foot interface, and primary window manager 66 may not be active. If primary window manager 66 is not active, auxiliary window manager 70 may simply return control to operating system 60 or the application that generated the window, as indicated at block 260. Auxiliary window manager 70 may return control to the appropriate software component without modifying the return code provided by operating system 60 in response to the user application's window generation request. Therefore, from the perspective of the user, the legacy window may appear and operate as normal.

If primary window manager 66 is active, the process may pass to block 232, which depicts auxiliary window manager 70 determining whether primary window manager 66 is operating in full-screen mode. If primary window manager 66 is not in full-screen mode, auxiliary window manager 70 may simply return control to operating system 60 or the user application without modifying the window activation return code, as depicted at block 260 and indicated above. The determinations of blocks 230 and 232 may be made based on data in state machine 52.

If primary window manager 66 is in full-screen mode, auxiliary window manager 70 may determine whether notification concerning the legacy window should be either presented to the user or blocked, based on the user preference settings. For instance, if the legacy window was generated by an anti-virus program, and the user preferences indicate that windows from that program should always cause notification to be displayed, auxiliary window manager 70 would determine at block 240 that notification should not be blocked.

In the example embodiment, state machine 52 maintains a database to keep track of the two-foot interface windows it has seen before and what the user has chosen to do with those windows (e.g., whether the user has chosen to ignore those windows). Any suitable type of database could be used, including something as simple as a text file, which could possibly be XML-based, or something as complex as a Microsoft Access database. The information in the database may be treated as user preference settings.

If auxiliary window manager 70 determines at block 240 that notification is to be blocked, auxiliary window manager 70 may then return control to operating system 60 or the subject application, as depicted at block 260 and described above. For instance, auxiliary window manager 70 may simply allow the legacy window to display behind the ten-foot interface, as depicted in FIG. 3, or auxiliary window manager 70 may block the window by using a call application programming interface (API) function (e.g.,="SetWindowsHookEx") to return an error code (e.g., −1) to the legacy application.

If notification is not to be blocked, auxiliary window manager 70 may display a prompt in a window designed for a ten-foot interface, as indicated at block 242. For example, as shown in FIG. 4, the prompt may identify the application that attempted to display the legacy window, and may include objects that the user can select with remote control 46 to indicate whether or not primary window manager 66 should be transitioned out of full-screen mode, to allow the user to interact with legacy windows in a two-foot interface. Auxiliary window manager 70 may operate as a plug-in to primary window manager 66, in effect extending primary window manager 66 to display such windows. In particular, in one embodiment, auxiliary window manager 70 plugs in to primary window manager 66 by creating an add-in application to the primary window manager through the primary window manager's extension interface. For instance, in an environment using MCE, auxiliary window manager 70 may be designed to use the Media Center Add-in Object Model. Additional details on that model may be found on the Internet at msdn.microsoft.com/library/default.asp?url=/library/en-us/MedctrSDK/htm/mediacenteraddinobjectmodel-reference.asp.

If the user elects for primary window manager 66 to stay in full screen mode, the process may pass from block 250 to 260, with auxiliary window manager 70 returning control to operating system 60 or the subject application, as described above. For instance, auxiliary window manager 70 may simply allow the legacy window to be hidden or may block the window, as discussed above.

However, if the user selects the option to display the legacy window, the process may pass from block 250 to block 252. At block 252, auxiliary window manager 70 may cause primary window manager 66 to exit full-screen mode and enter a different mode, such as a reduced mode or a minimized mode. For instance, in the example embodiment, primary window manager 66 is itself a window, and auxiliary window manager 70 sends a Windows Message to that window through the ShowWindow API to cause the ten-foot interface window to minimize to the system tray. Additional details on the ShowWindow API may be found on the Internet at msdn.microsoft.com/library/default.asp?url=/library/en-us/winui/winui/windowsuserinterface/windowing/windows/windowreference/windowfunctions/showwindow.asp. Once primary window manager 66 has exited full-screen mode, the legacy window generated by the user application may be visible on the screen. As indicated at block 260, auxiliary window manager 70 may then return control to the legacy application or to operating system 60. The user may then interact with the legacy window using legacy input devices. The process may then return to block 220, with auxiliary window manager 70 waiting for the next legacy window to be generated.

In alternative embodiments, the auxiliary window manager may display a window such as window 140 in the ten-foot interface after allowing the legacy window to display behind the ten-foot interface returning a completion code to the legacy application.

As has been described, the example embodiment provides a convenient mechanism for notifying a person using a ten-foot interface about legacy windows, and for allowing the user to transition out of the ten-foot interface. Alternative embodiments may use other approaches to facilitate interaction with legacy windows. For example, one embodiment may present ten-foot interface windows that proxy hidden two-foot interface windows, and may use operating system hooks such as a journal record hook and a journal playback hook to receive input from a remote control and convert that input into data for interacting with the hidden legacy windows.

Processing systems that provide for a ten-foot interface may include numerous legacy applications that only support a two-foot interface. The legacy applications may eventually be updated to support a ten-foot interface. An auxiliary window manager according to the present invention may serve as bridging technology, eliminating or reducing the need for a developer to update a legacy application to support the ten-foot interface.

In light of the principles and example embodiments described and illustrated herein, it will be recognized that the described embodiments can be modified in arrangement and detail without departing from such principles. For instance, although the example embodiment describes a user interacting with an auxiliary window manager by pushing buttons on a remote control, in alternative embodiments the user could use other mechanisms to interact with the auxiliary window manager. For instance, a processing system could include a microphone and speech recognition software or hardware, and the user could interact with the auxiliary window manager by speaking to the processing system from a distance, without using a legacy input device such as a mouse or keyboard. Thus, in some embodiments, the remote-enabled windows produced by the auxiliary window manager may be considered voice-enabled windows.

For example, in one embodiment, the auxiliary display manager may include a speech recognition module, and that module may include a database of known or predetermined voice commands and corresponding actions. Based on the state in the state machine, a subset of voice commands from the database would be valid. If the user spoke a valid command which was recognized by the speech recognition software, the appropriate action would executed, thereby causing the desired change to the state machine.

For instance, in one example sequence of operations, a two-foot interface virus notification window pops up behind MCE and is caught by the window activation hook. The window activation hook then causes the processing system to display a ten-foot interface window prompting the user to provide input to indicate what he or she wants to do. The user then dictates "show two-foot window," which happens to be a valid, known voice command. In response, the auxiliary window manager minimizes MCE and displays the two-foot interface virus notification window. The user then dictates "press cancel", another known command. In response, the auxiliary window manager sends the two-foot interface dialog a window message effectively pressing the cancel button. The auxiliary window manager then maximizes MCE again, so that the user's ten-foot interface experience can continue.

Similarly, although example embodiments may be described with reference to a particular operating system, other operating systems and/or related components may operate in a similar manner in alternative embodiments.

Also, even though expressions such as "in one embodiment," "in another embodiment," or the like may be used herein, these phrases are meant to generally reference embodiment possibilities, and are not intended to limit the invention to particular embodiment configurations. As used herein, these terms may reference the same or different embodiments that are combinable into other embodiments.

Similarly, although example processes have been described with regard to particular operations performed in a particular sequence, numerous modifications could be applied to those processes to derive numerous alternative embodiments of the present invention. For example, alternative embodiments may include processes that use fewer than all of the disclosed operations, processes that use additional operations, processes that use the same operations in a different sequence, and processes in which the individual operations disclosed herein are combined, subdivided, or otherwise altered.

Alternative embodiments of the invention also include machine-accessible media containing instructions for performing the operations of the invention. Such embodiments may also be referred to as program products. Such machine-accessible media may include, without limitation, storage media such as floppy disks, hard disks, CD-ROMs, ROM, and RAM, and other detectable arrangements of particles manufactured or formed by a machine or device. Instructions may also be used in a distributed environment, and may be stored locally and/or remotely for access by single or multi-processor machines.

It should also be understood that the hardware and software components depicted herein represent functional elements that are reasonably self-contained so that each can be designed, constructed, or updated substantially independently of the others. In alternative embodiments, many of the components may be implemented as hardware, software, or combinations of hardware and software for providing the functionality such as that described and illustrated herein. The hardware, software, or combinations of hardware and software for performing the operations of the invention may also be referred to as logic or control logic.

In view of the wide variety of useful permutations that may be readily derived from the example embodiments described herein, this detailed description is intended to be illustrative only, and should not be taken as limiting the scope of the invention. What is claimed as the invention, therefore, is all implementations that come within the scope and spirit of the following claims and all equivalents to such implementations.

What is claimed is:

1. An apparatus, comprising:
   a processor;
   a primary window manager to use the processor to display a first remote-enabled window in a display device of a processing system, and to prevent mouse-enabled windows from displaying in front of the first remote-enabled window; and
   an auxiliary window manager to automatically display a second remote-enabled window in front of the first remote-enabled window in response to (a) determining the primary window manager is operating in full-screen mode and (b) detecting an attempt by a program to display a mouse-enabled window;
   wherein the mouse-enabled window only supports receiving user input from one or more legacy user input devices different from a remote control;
   wherein the second remote-enabled window comprises an object that a user can select with a remote control to instruct the processing system to display the mouse-enabled window.

2. An apparatus according to claim 1, wherein the auxiliary window manager comprises a window activation handler, the window activation handler to determine whether the second program has attempted to display the mouse-enabled window based at least in part on information received from a window activation hook of an operating system of the processing system.

3. An apparatus according to claim 1, wherein the auxiliary window manager comprises a plug-in to provide added functionality to the primary window manager.

4. A method, comprising:
   after a primary window manager has displayed a first remote-enabled window in a display device of a processing system, detecting an attempt to display a mouse-enabled window in the display device, wherein the attempt was generated by a software application without direct prompting from a user; and
   automatically displaying a second remote-enabled window in front of the already displaying first remote-enabled window in response to (a) determining the primary window manager is operating in full-screen mode, and (b) detecting the attempt to display the mouse-enabled window;

wherein the mouse-enabled window only supports receiving user input from one or more legacy user input devices different from a remote control;

wherein the second remote-enabled window comprises an object that a user can select with a remote control to instruct the processing system to display the mouse-enabled window.

5. A method according to claim 4, comprising:
automatically displaying the second remote-enabled window in front of the first remote-enabled window after the primary window manager has prevented the mouse-enabled window from being displayed in front of the first remote-enabled window.

6. A method according to claim 4, further comprising:
based on a determining the software application is included in a previously constructed white list of software applications, automatically displaying the second remote-enabled window in front of the already displaying first remote-enabled window;
receiving user input electing for the mouse-enabled window to be displayed; and
in response to receiving the user input, automatically causing the primary window manager to transition out of full-screen mode.

7. A method according to claim 4, further comprising:
receiving, at a window activation handler, information from a window activation hook of an operating system of the processing system; and
wherein the operation of detecting an attempt by a program to display a mouse-enabled window is based at least in part on the information received from the window activation hook.

8. A method according to claim 4, wherein the operation of detecting an attempt by a program to display a mouse-enabled window comprises detecting an attempt by a legacy application to display a window that is not remote enabled.

9. A method according to claim 4, wherein the operation of automatically displaying a second remote-enabled window comprises displaying a voice-enabled window.

10. A method according to claim 4, wherein:
the operation of automatically displaying a second remote-enabled window comprises displaying a voice-enabled window; and
the method further comprises:
receiving a spoken command;
automatically determining whether the spoken command corresponds to an instruction to display the mouse-enabled window; and
in response to a determination that the spoken command comprises an instruction to display the mouse-enabled window, automatically causing the processing system to display the mouse enabled window.

11. A method according to claim 4, comprising:
automatically displaying the second remote-enabled window in front of the first remote-enabled window after the primary window manager has trapped and prevented a non-user solicited attempt to display the mouse-enabled window in front of the first remote-enabled window.

12. A method according to claim 4 including, based on a database corresponding to previous user input decisions electing to display mouse-enabled windows, displaying the second remote-enabled window in front of the already displaying first remote-enabled window.

13. A manufacture, comprising:
a machine-accessible storage medium; and
instructions stored in the machine-accessible storage medium, wherein the instructions, when executed in a processing system, cause the processing system to perform operations comprising:
after a primary window manager has displayed a first remote-enabled window in a display device of the processing system, detecting an attempt to display a mouse-enabled window;
automatically displaying a second remote-enabled window in front of the first remote-enabled window in response to (a) determining the primary window manager is operating in full-screen mode, and (b) detecting the attempt to display the mouse-enabled window;
wherein the mouse-enabled window only supports receiving user input from one or more legacy user input devices different from a remote control;
wherein the second remote-enabled window comprises an object that a user can select with a remote control to instruct the processing system to display the mouse-enabled window.

14. A manufacture according to claim 13, wherein the instructions cause the processing system to display the second remote-enabled window in front of the first remote-enabled window after the primary window manager has prevented the mouse-enabled window from being displayed in front of the first remote-enabled window.

15. A manufacture according to claim 13, wherein the instructions cause the processing system to automatically cause the primary window manager to transition out of full-screen mode, in response to receiving the user input electing for the mouse-enabled window to be displayed.

16. A manufacture according to claim 13, wherein the instructions detect the attempt to display the mouse-enabled window based at least in part on the information received from a window activation hook of an operating system of the processing system.

17. A manufacture according to claim 13, wherein the second remote-enabled window comprises a voice-enabled window.

18. A manufacture according to claim 13 wherein:
the second remote-enabled window comprises
a voice-enabled window; and
the instructions, when executed in the processing system, allow the processing system to perform further operations comprising:
receiving a spoken command;
automatically determining whether the spoken command corresponds to an instruction to display the mouse-enabled window; and
in response to a determination that the spoken command comprises an instruction to display the mouse-enabled window, automatically causing the processing system to display the mouse enabled window.

* * * * *